United States Patent
Leung

(10) Patent No.: US 7,870,129 B2
(45) Date of Patent: Jan. 11, 2011

(54) HANDLING ERROR DOCUMENTS IN A TEXT INDEX

(75) Inventor: Tony Kai-Chi Leung, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 887 days.

(21) Appl. No.: 11/754,216

(22) Filed: May 25, 2007

(65) Prior Publication Data

US 2008/0294657 A1    Nov. 27, 2008

(51) Int. Cl.
G06F 17/30    (2006.01)

(52) U.S. Cl. .................................. 707/728; 715/234

(58) Field of Classification Search ............... 707/673, 707/696, 697, 711, 715, 741, 840, 608, 694, 707/727, 728, 830; 714/714; 715/234, 705, 715/712, 721, 776, 760, 783, 856
See application file for complete search history.

(56) References Cited

U.S. PATENT DOCUMENTS

| | | | |
|---|---|---|---|
| 7,058,886 B1 | 6/2006 | Sulistio et al. | |
| 2002/0120641 A1 | 8/2002 | Rozek et al. | |
| 2003/0233618 A1 | 12/2003 | Wan | |
| 2004/0205544 A1 | 10/2004 | Aggarwal et al. | |
| 2004/0237028 A1 | 11/2004 | Softky | |
| 2006/0036614 A1 | 2/2006 | Simske et al. | |
| 2006/0126101 A1* | 6/2006 | Shutt et al. | 358/1.15 |

OTHER PUBLICATIONS

Fuhr, N., and C. Buckley, "A Probabilistic Learning Approach for Document Indexing", ACM Transactions on Informatino Systems, vol. 9, No. 3, Jul. 1991, pp. 223-248.

Takasu, A., and K. Aihara, "Quality Enhancement in Information Extraction from Scanned Documents", Proceedings of the 2006 ACM Symposium on Document Engineering, Oct. 2006, pp. 122-124.

* cited by examiner

Primary Examiner—Fred I Ehichioya
(74) Attorney, Agent, or Firm—Janaki K. Davda; Konrad Raynes & Victor LLP

(57) ABSTRACT

Provided are techniques for handling error documents. One or more entries for error documents are stored in a text index. A document with a document identifier is received. It is determined whether the document has an entry in the text index.

35 Claims, 9 Drawing Sheets

HANDLING ERROR DOCUMENTS IN A TEXT INDEX

BACKGROUND

1. Field

Embodiments of the invention relate to handling error documents in a text index.

2. Description of the Related Art

The World Wide Web (also known as WWW or the "Web") is a collection of some Internet servers that support Web pages that may include links to other Web pages. A Uniform Resource Locator (URL) indicates a location of a Web page (which is a type of document). Also, each Web page may contain, for example, text, graphics, audio, and/or video content. For example, a first Web page may contain a link to a second Web page. Thus, the Web may be described as a series of interconnected web pages with links connecting the web pages from different web sites together. A web site may be described as a related set of Web pages.

A Web browser is a software application that is used to locate and display Web pages. Currently, there are billions of Web pages on the Web.

Web search engines are used to retrieve Web pages on the Web based on some criteria (e.g., entered via the Web browser). That is, Web search engines are designed to return relevant Web pages given a keyword search request (also known as a search request). For example, the search request "HR" issued against a company intranet search engine is expected to return relevant pages in the intranet that are related to Human Resources (HR). The Web search engine uses indexing techniques that relate search terms (e.g., keywords) to Web pages.

In a text indexing system, which fetches and indexes documents (e.g., Web pages from the Web) using a text index, there is potential for encountering documents with errors (also referred to as error documents). That is, many documents on the web have syntax errors that may cause a parser to ignore certain parts of those documents. Also, sometimes an incorrect data format is specified for a document, such as a binary word file masquerading as a plain text file. These errors could cause the documents in question to be indexed incorrectly. When a document is not indexed because of such an error, an administrator needs a quick and easy way to find out what happened during the processing of that document.

In particular, each document fetched is identified by a unique string called a URL. All URLs are assumed to be unique throughout the Web. If a document with the same URL is received later, it is considered an update of a document with the same URL received earlier. So, assume the text indexing system received four URLs: A, B, C, and D. Assume also that URLs A, C, and D could be parsed and indexed properly, while URL B contains an error that prevents it from being indexed. In a typical text index processing system, URLs A, C, and D are added to the text index, while URL B's error is written out into a log.

To find the status of a URL, an administrator would go to the text index to see whether that URL has been indexed. If the URL is not in the index (as would be the case for URL B), then the administrator would go to the log file to see there is any error for the URL. The drawback of this approach is that the log file may get large and also require maintenance to purge it of old records that are no longer applicable. For instance, if, at a later time, URL B is received and can be indexed without error, then the log file should be updated to remove the now obsolete error entry for URL B. On the other hand, if, at the later time, URL B is received again and a new error appears, then the log file should be updated to reflect the new error. Also, to save space, log files are often overwritten after a few days. Thus, the traditional method of logging the errors in an error file does not work well.

One alternative to a log file is to make use of a relational table for storing either for all the processing results or just the errors. With a relational table, modifications of the error data for documents that may have been updated may be handled easily because a relational database provides update capabilities. This approach, on the other hand, requires the presence of a relational database, and special code needs to be written for interfacing with the relational tables that are distinct and separate from the text index lookup. In addition, use of a relational table may have a negative impact on performance.

Thus, there is a need in the art for improved handling of error documents in an index.

SUMMARY OF EMBODIMENTS OF THE INVENTION

Provided are a method, computer program product, and system for handling error documents. One or more entries for error documents are stored in a text index. A document with a document identifier is received. It is determined whether the document has an entry in the text index.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
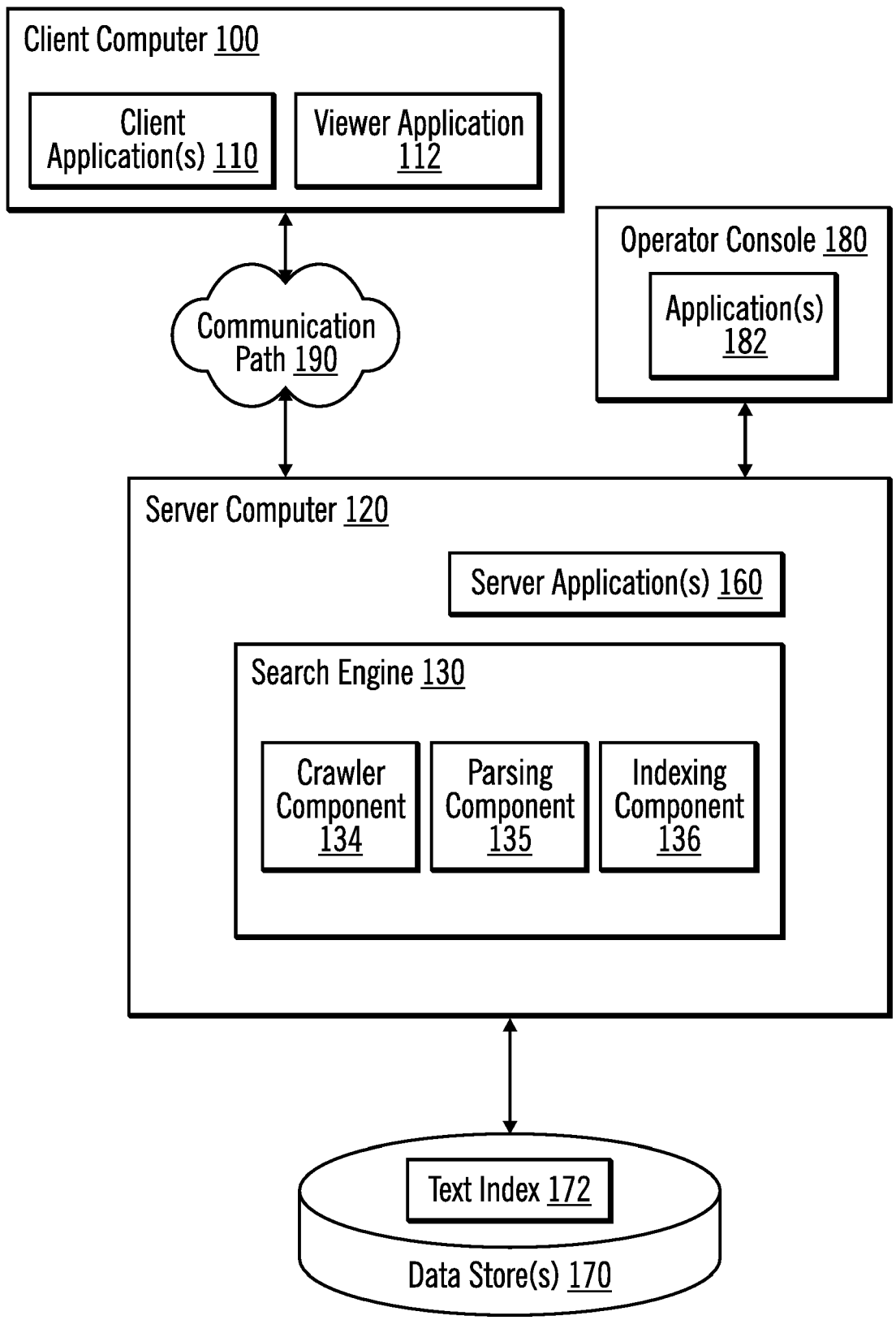
FIG. 1 illustrates, in a block diagram, a computing environment in accordance with certain embodiments of the invention.

FIG. 1 illustrates, in a block diagram, a computing environment in accordance with certain embodiments of the invention. A client computer 100 is connected via a communication path 190 to a server computer 120. The client computer 100 may comprise any computing device known in the art, such as a server, mainframe, workstation, personal computer, hand held computer, laptop telephony device, network appliance, etc. The communication path 190 may comprise, for example, any type of network, such as, a Storage Area Network (SAN), a Local Area Network (LAN), Wide Area Network (WAN), the Internet, an Intranet, etc. The viewer application 112 provides an interface that enables searching of a set of documents (e.g., stored in one or more data stores 170). In certain embodiments, the viewer application 112 is a Web browser.

The search engine includes a crawler component 134, a parsing component 135, and an indexing component 136. Although components 134, 135, and 136 are illustrated as separate components, the functionality of components 134, 135, and 136 may be implemented in fewer or more or different components than illustrated. Additionally, the functionality of the components 134, 135, and 136 may be implemented at a Web application server computer or other server computer that is connected to the server computer 120. Additionally, one or more server applications 160 may execute at server computer 120. The server computer 120 provides the client computer 100 with access to data in at least one data store 170 (e.g., a database). Although a single data store 170 is illustrated, for ease of understanding, data in data store 170 may be stored in data stores at other computers connected to server computer 120.

A text index 172 may be stored in the data store 170. In alternative embodiments, the text index 172 may be stored elsewhere.

Also, an operator console 180 executes one or more applications 182 and is used to access the server computer 120 and the data store 170.

The data store 170 may comprise an array of storage devices, such as Direct Access Storage Devices (DASDs), Just a Bunch of Disks (JBOD), Redundant Array of Independent Disks (RAID), virtualization device, etc. The data store 170 includes data that is used with certain embodiments of the invention.

Figure 2:
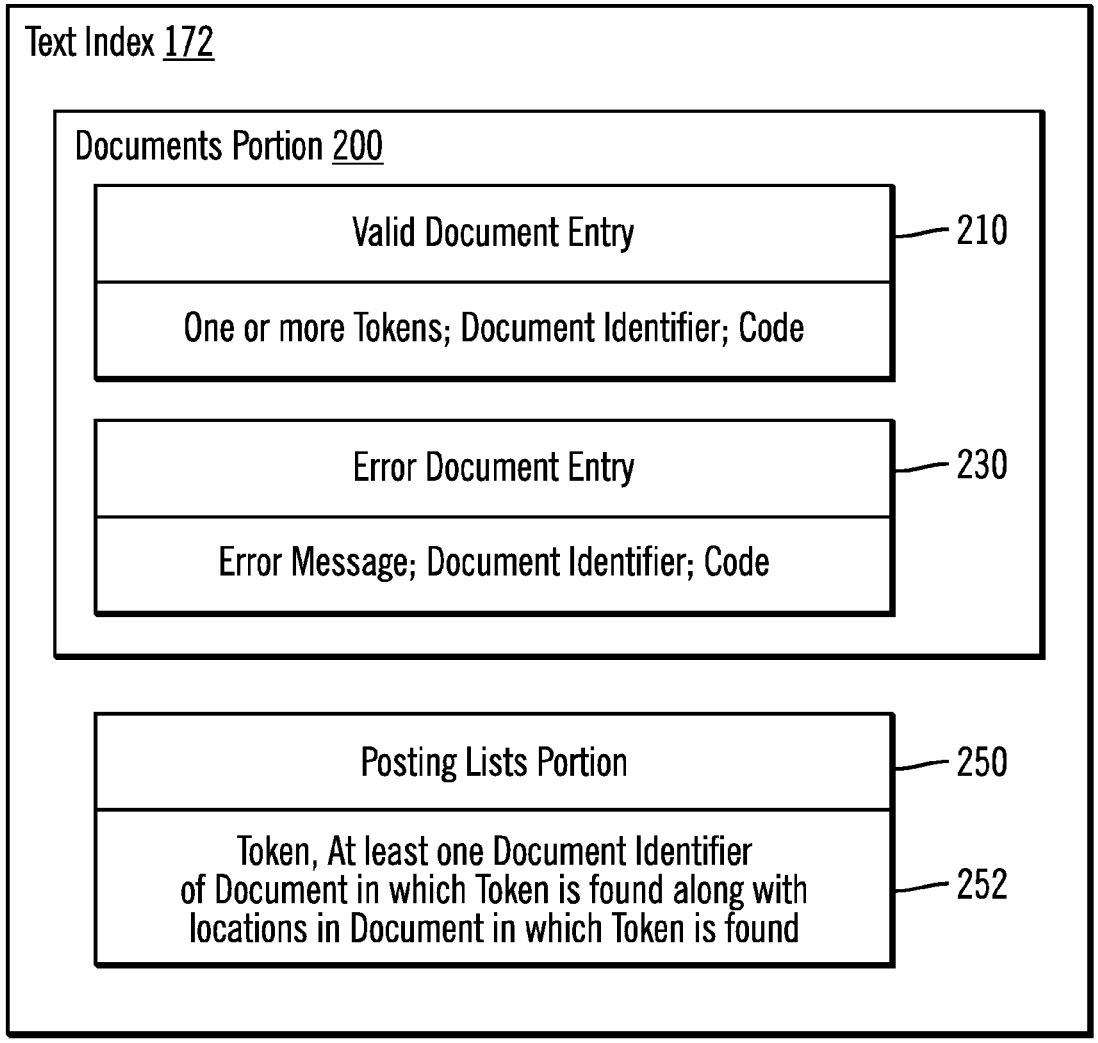
FIG. 2 illustrates an example structure of a text index in accordance with certain embodiments

FIG. 2 illustrates an example structure of a text index 172 in accordance with certain embodiments. The text index 172 has a documents portion 200 and a posting lists portion 250. These portions may also be referred to as a first portion 200 and a second portion 250. The documents portion 200 includes valid document entries (e.g., entry 210) and error document entries (e.g., entry 230). A code field that indicates whether the document associated with the entry is a valid document or an error document is used to distinguish between the valid and error document entries.

The valid document entry 210 includes a first field for one or more tokens (forming document text) found in a valid document; a second field for a document identifier (e.g., the URL, document number, etc.); and a code field that indicates whether the document is a valid document or an error document (in the valid document entry 210, this code field indicates that this is a valid document).

The error document entry 230 includes a first field that stores an error message (instead of one or more tokens because this document could not be properly processed); a second field for a document identifier (e.g., the URL, document number, etc.); and a code field that indicates whether or not this document is an error document (in the error document entry 230, this code field indicates that this is an error document).

A field may be indexable (e.g., searchable in response to a search request), storable, or both. In certain embodiments, for a valid document entry 210, the first field, the second field, and the code field are indexable and storable; while, for an error document entry 230, the second field and the code field are indexable and storable, but the first field is storable. Because the first field of the error document entry 230 is storable, but not indexable, when a search for documents is submitted against the text index 172 (e.g., a user has requested documents with the term "fox"), the error document entry is not included in the results of the search.

In the posting lists portion 250, each entry 252 identifies a token and at least one document identifier of a document in which the token is found along with locations in document in which the token is found.

Although representations of a single valid document entry 210, a single error document entry 230, and a single posting list 252 are illustrated, there may be zero or more of each of these in the text index 172 at any given point in time.

Thus, the text index 172 contains entries for valid documents, entries for error documents, and posting lists. It is to be noted that the text index 172 includes a collection of posting lists, mapping tokens to their positions in documents, but each error document entry 230 of the text index 172 stores document information (not tokens, as error documents cannot be parsed and tokenized). For example, when a user searches for a term "dream", the indexing component 136 retrieves document identifiers of the valid documents from the text index 172 that contain this term. In addition to identifying these documents, the indexing component 136 provides the tokens from the token field, which form the content of the document, to the search engine 130. The search engine 130 uses the document content (i.e., tokens) to provide a "summary" of the document, with the search request terms highlighted. Therefore, in addition to "indexing" a valid document by adding tokens to the posting lists portion 250, the indexing component 136 also stores the document (in the form of tokens) into the text index 172. Note that for a valid document, the document text is stored; while, for an error document, an error message is stored.

The code field is an indicator of whether there is an error in processing the document. When a user asks for the status of a document, the indexing component 136 accesses an entry for the document (assuming one exists) and provides an indication of whether the document was successfully processed using the code field.

In particular, the parsing component 135 is not able to parse error documents. For each valid document, the parsing component 135 extracts text from a document, and this text is run through a tokenization process to break a text string up into different tokens. For example, the document text "Goodnight cow jumping over the moon" from a document with an associated URL may be broken up into six tokens: Goodnight, cow, jumping, over, the, moon.

In a traditional relational database, this most likely will result in a record being inserted into a relational database, with the document key being the URL and the content being stored in a Binary Large Object (BLOB) column. A relational table is optimized for retrieval when the user knows the document key (i.e., the URL) and wants to retrieve the content, i.e., the BLOB.

On the other hand, with embodiments, the text index 172 stores the content differently from a traditional relational database. With the text index 172, a valid document entry 210 that includes the tokens ("Goodnight", "cow", "jumping", "over", "the", "moon"), the URL, and a code field indicating that this is a valid document is added to the text index 172.

After tokenization of valid documents, a posting list is built for each token, and the indexing component 136 builds an entry in the posting lists portion 250 for each posting list. Also, instead of storing the relationship between the document key and the content (as is done in a relational database), the text index 172 stores the relationship of each individual token pointing to the document key (i.e., the URL) in the posting lists portion 250. So, the text index 172 would have six entries in the posting lists portion 250 after processing the document text "Goodnight cow jumping over the moon", one for each token: Goodnight, cow, jump, over, the, moon. Each token points back to the same URL of the document in which the tokens were found.

In certain embodiments, if other documents refer also to cows, the text index 172 posting lists portion 250 may include the following entry:

cow: URL1, URL2 . . .

In certain embodiments, the URLs of the documents are mapped to a single document number to avoid storing the URLs as individual text strings. This storage format allows, for example, retrieval of all the documents that have the word "cow" in them rapidly.

Figure 3A:
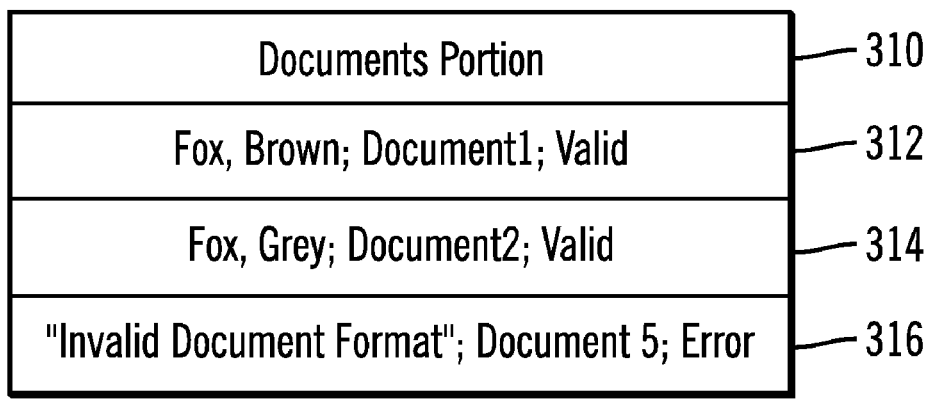
FIGS. 3A, 3B, and 3C illustrate example text index entries in accordance with certain embodiments.
Figure 3A:
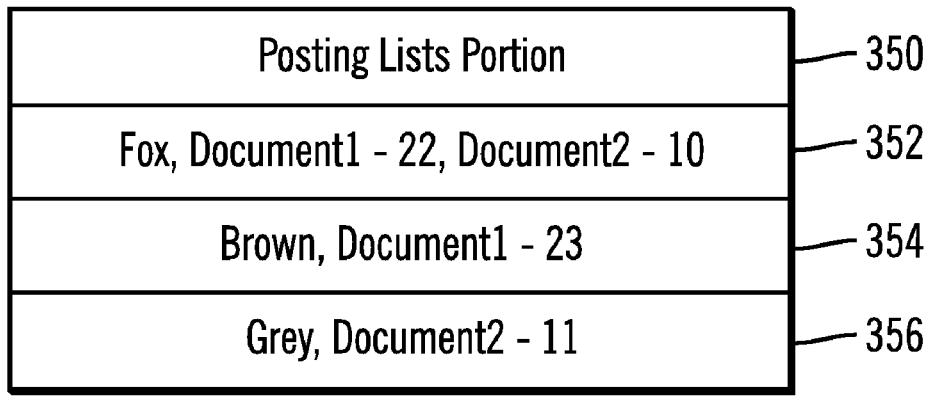
Figure 3B:
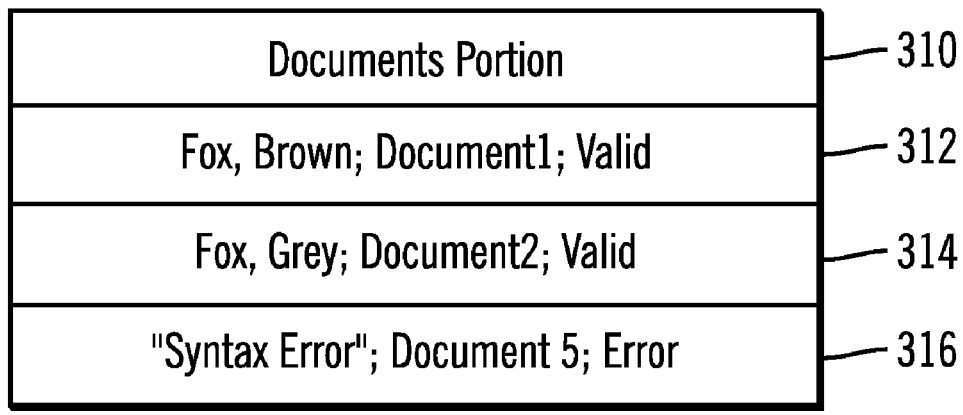
Figure 3C:
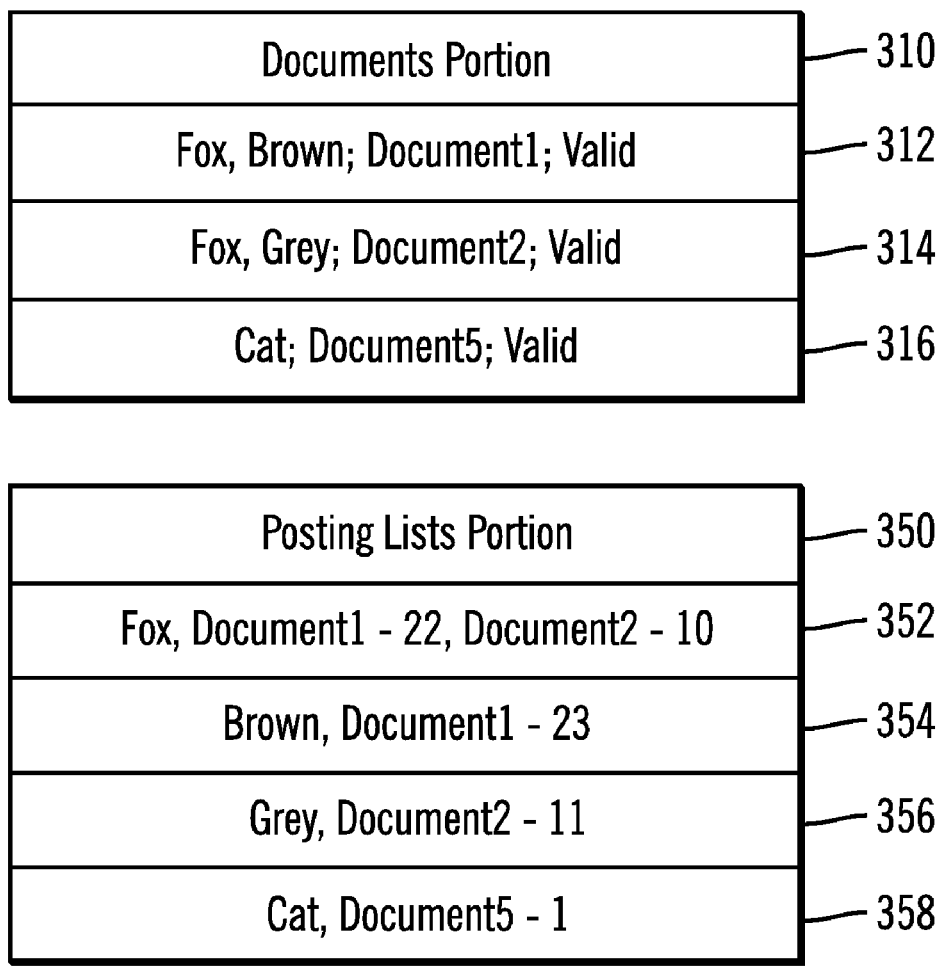

FIGS. 3A, 3B, and 3C illustrate example text index entries in a text index 300 in accordance with certain embodiments. Text index 300 is an example of text index 172. Assume that a first document (Document1) is received and successfully processed (e.g., parsed). Document1 includes the terms: "fox" and "brown". Then, the indexing component 136 adds an entry 312 to the documents portion 310 for Document1. Entry 312 includes tokens "fox" and "brown", an identifier for Document1, and an indication that this is a valid document. For each of the tokens "fox" and "brown", the indexing component 136 adds an entry 352, 354 in the posting lists portion 350. Entry 352 includes the token "fox", Document1-22 (where 22 is a location in Document1 at which the token "fox" is found). Entry 354 includes the token "brown", Document1-23 (where 23 is a location in Document1 at which the token "brown" is found).

Next, a second document (Document2) is received and successfully processed. Document2 includes the terms: "fox" and "grey". Then, the indexing component 136 adds an entry 314 to the documents portion 310 for Document2. Entry 314 includes tokens "fox" and "grey", an identifier for Document2, and an indication that this is a valid document. For the token "fox", the indexing component 136 updates the entry 352 to include a reference to Document2. Also, the indexing component 136 adds a new entry 356 for the token "grey" in the posting lists portion 350.

Then, a third document (Document5) is received and is not successfully processed. The indexing component 136 adds an entry 316 to the documents portion 310. Entry 316 includes an error message "Invalid Document Format", an identifier for Document5, and an indication that this is an error document.

Going on to FIG. 3B, assume that Document5 is fetched at another time and parsed. It is determined that Document5 is an error document. The indexing component 136 deletes existing entry 316 for Document5 and adds a new entry 316 for Document5. The new entry 316 includes a new error message "Syntax Error", an identifier for Document5, and an indication that this is an error document.

Going to FIG. 3C, assume that Document5 is fetched again and is successfully processed. Document5 includes the term: "cat". Then, the indexing component 136 deletes existing entry 316 for Document5 and adds a new entry 316 for Document5. Entry 316 includes the token "cat", an identifier for Document5, and an indication that this is a valid document. The indexing component 136 also adds an entry 358 for the token "cat" in the posting lists portion 350. Entry 358 includes the token "cat", Document5-1 (where 1 is a location in Document5 at which the token "cat" is found).

With reference to FIG. 3A, note that if a search request were received that included a term in the error message (e.g., the term "format"), then the indexing component 136 does not return Document5 in response to the search request. On the other hand, it is possible for a user (e.g., a system administrator) to search for Document5 and receive the error message "Invalid Document Format".

Figure 4:
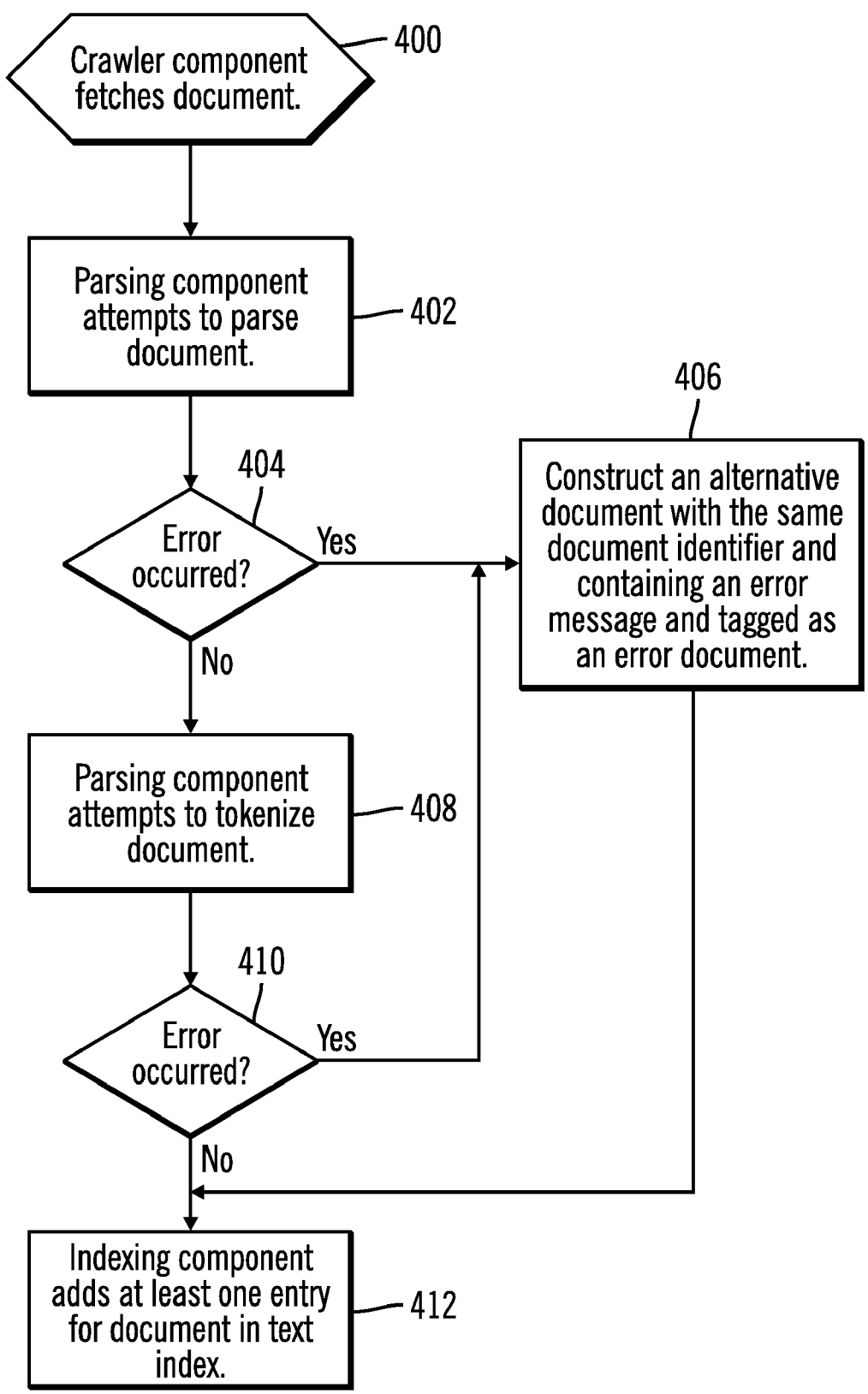
FIG. 4 illustrates logic for processing a document in accordance with certain embodiments.

FIG. 4 illustrates logic for processing a document in accordance with certain embodiments. Control begins at block 400 with the crawler component 134 fetching a document (e.g., a Web page). In block 402, the parsing component 135 attempts to parse the document. In certain embodiments, the parsing component 135 extracts text strings that are to be indexed, while removing formatting information (e.g., indications that the text is "bold" or "italic"). In block 404, the parsing component 135 determines whether an error occurred during parsing. If so, processing continues to block 406, otherwise, processing continues to block 408 and tokenizes the document.

In block 406, the parsing component 135 constructs an alternative document with the same document identifier that contains an error message and is tagged as an error document and processing continues to block 412.

In block 408, the parsing component 135 attempts to tokenize the document. In certain embodiments, the parsing component 135 breaks up the text strings into individual text tokens. In block 410, the parsing component 135 determines whether an error occurred during tokenization. If so, processing continues to block 406, otherwise, processing continues to block 412.

In block 412, the indexing component 136 adds at least one entry for the document in the text index 172. In particular, for an error document, the indexing component 136 adds one entry to the documents portion 200. For a valid document, the indexing component 136 adds an entry to the documents portion 200 and adds one or more entries to the posting lists portion 250. Note that to update an existing entry, the indexing component 136 deletes the existing entry and adds a new entry.

At the time processing reaches block 412, a valid document to be indexed consists of a series of tokens to be indexed. In certain embodiments, the indexing component 136 stores tokens in an indexable and storable field in an entry in the documents portion 200, stores the document identifier in another indexable and storable field in the entry, and stores a code field (which is an indexable and storable field) with a valid code. The posting lists portion 250 is updated based on the tokens.

Also, at the time processing reaches block 412, an error document is represented with a document containing an error message. In certain embodiments, the indexing component 136 stores the error message in a storable field in an entry in the documents portion 200, stores the document identifier in another indexable and storable field in the entry, and stores a code field (which is an indexable and storable field) with an error code. Thus, the indexing component 136 stores content from storable fields that are not indexable as part of the index.

Embodiments leverage the unstructured nature of a text index. With embodiments, instead of just indexing text documents, errors about the documents are also indexed. In this manner, embodiments combine the function of an error log with the function of a document index. Also, document status lookups may be translated into a simple search request to the text index. With a single lookup, it is possible to find out whether a document has been processed successfully or not, and, if not, to obtain the processing error as part of the search result. Also, if a document has been updated, its status in the index is also updated as part of the document replacement operation during the update.

Figure 5:
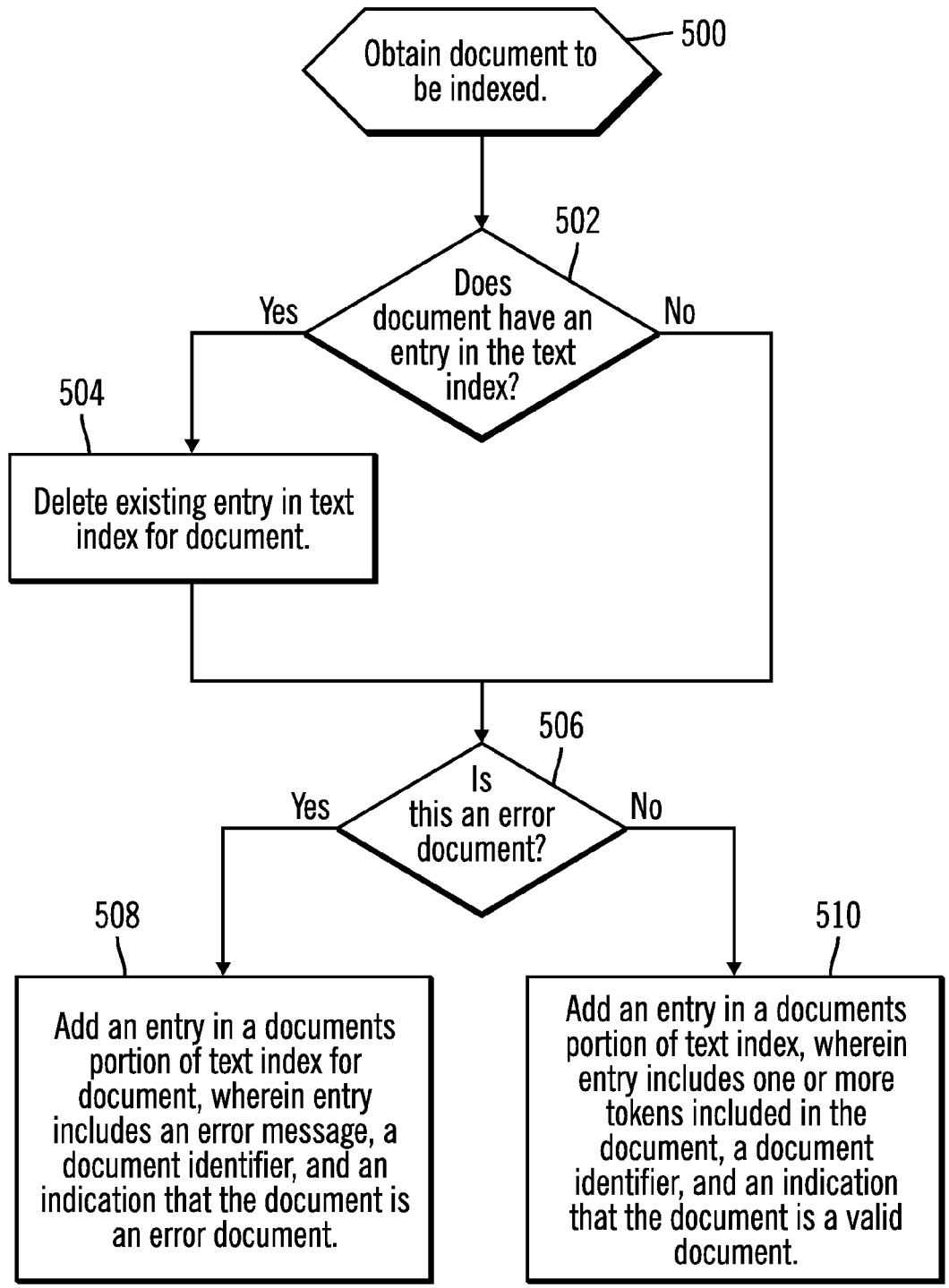
FIG. 5 illustrates logic to build and maintain a text index in accordance with certain embodiments.

FIG. 5 illustrates logic to build and maintain a text index in accordance with certain embodiments. Control begins at block 500 with the indexing component 136 obtaining a document to be indexed (e.g., selecting a fetched and parsed document). In block 502, the indexing component 136 determines whether this document has an entry in the text index 172 by searching for the document identifier in the documents portion 200 of the text index 172. If the document has an entry (i.e., its document identifier was found in the text index 172), processing continues to block 504, otherwise, processing continues to block 506. In block 504, the indexing component 136 deletes the existing entry in the text index 172 for the document and processing continues to block 506.

In block 506, the indexing component 136 determines whether this is an error document. If so, processing continues to block 508, otherwise, processing continues to block 510. In block 508, the indexing component 136 adds an entry in the documents portion of the text index 172 for the document, wherein the entry includes an error message, a document identifier, and an indication that the document is an error document. In block 510, the indexing component 136 adds an entry in the documents portion of the text index, wherein the entry includes one or more tokens included in the document, the document identifier, and an indication that the document is a valid document.

Thus, with embodiments, an error document is added to the text index 172 just as a valid document would be. For example, assuming the search engine 130 received four URLs: A, B, C, and D and that URLs A, C, and D could be parsed and indexed properly, while URL B contains an error, when indexing, the indexing component 136 stores all four URLs A, B, C, and D into the text index 172. URL B represents a document that cannot be processed properly and is indexed as an error document, with a code field identifying that there was an error in processing and with an error message stored as document text.

Also, if URL B is subsequently received again, if the URL represents a valid document, the indexing component 136 deletes an entry for URL B from the documents portion 200 and adds a new entry in the documents portion 200 for URL B. If, on the other hand, a new error is encountered for URL B, the indexing component 136 deletes the existing entry for URL B from the documents portion 200 and adds a new entry in the documents portion 200 for URL B that identifies an error message (which may be the same or different error message from the one contained in the deleted entry for URL B).

The text index 172, unlike a relational database, does not really have a type system other than storing documents. In a relational database, there is a rigid schema that describes column types, and rows in a relational table are often homogeneous to be space efficient. This leads to programming logic in an application that needs to differentiate between error documents and valid documents because they are different structurally. However, with the text index 172, the indexing component 136 does not have to make such a distinction. The indexing component 136 knows that a document needs to be indexed and indexes the document accordingly, whether it is a valid tokenized document or a document describing an error (i.e., an error document). The interpretation of this document is left up to retrieval logic in the search engine 130. With this approach, no code from the indexing component 136 down needs to differentiate between documents having errors and documents without errors (i.e., valid documents).

Figure 6:
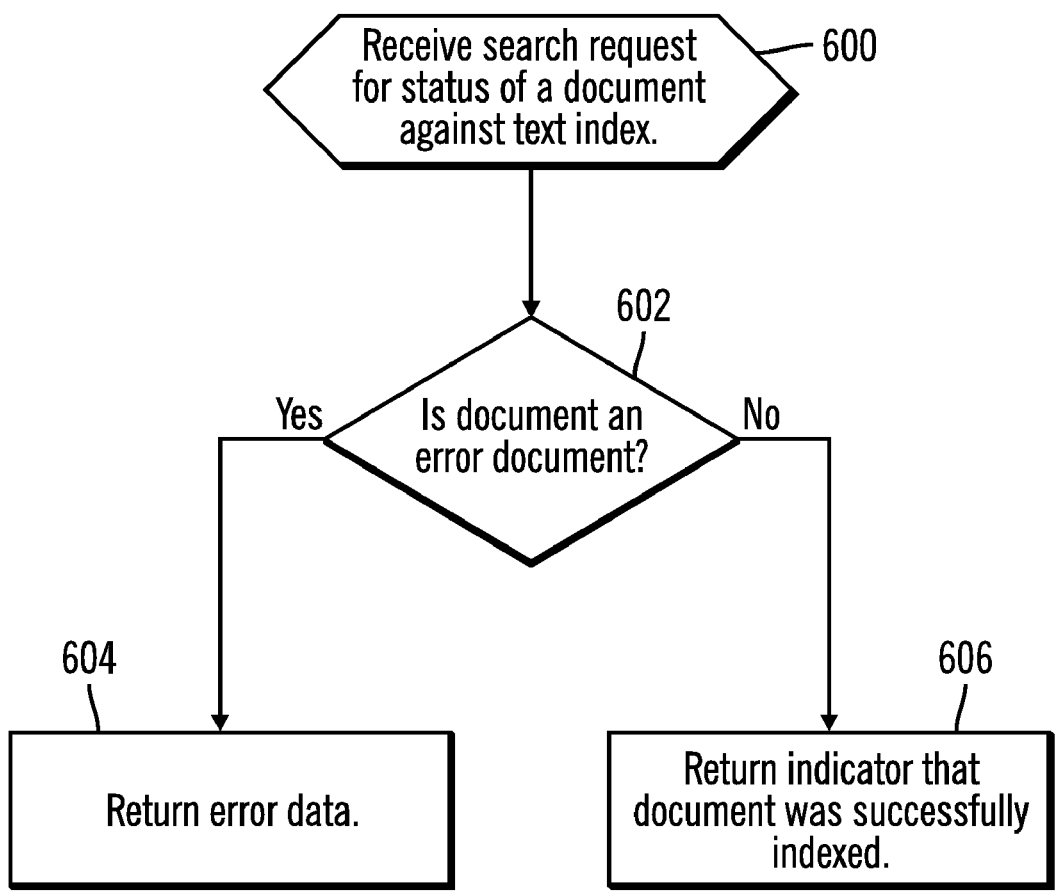
FIG. 6 illustrates logic for processing a search request against the index in accordance with certain embodiments.

FIG. 6 illustrates logic for processing a search request against the index in accordance with certain embodiments. Control begins at block 600 with the indexing system 136 receiving a search request for the status of a document (e.g., that specifies a URL for the document) against the text index 172. In block 602, the indexing system 136 determines whether the document is an error document by looking at the code field for the entry in the text index 172 for the document. If so, processing continues to block 604, otherwise, processing continues to block 606. In block 604, the indexing component 136 returns error data (e.g., an indication that this is an error document and an error message). In block 606, the indexing component 136 returns an indicator that the document was successfully indexed.

Thus, when an administrator needs to know the processing results of any document, the indexing component 136 looks up the document in the text index 172 and checks the code field. If the code field identifies the document as an error document, the indexing component 136 may display an error message encountered during processing of this document. If the document has no error, the indexing component 136 displays that the document is processed successfully.

In particular, when the text index 172 is used in a text search (e.g., to respond to a search request received by the search engine 130, such as "books by author ABC") for document content, error documents are not returned because, other than the document identifier and the code field, the error documents do not contain indexable content. If the user requests the document having the document identifier or requests documents with an error in the code field, the search engine 130 uses the text index 173 to return one or more error documents. This is useful to find out whether a document has been indexed successfully. For example, if a search request is received for a particular document identifier, there are two possibilities:

1. The returned document has an error code in the code field. This means that the document encountered an error during processing. The error message is retrieved from the error message field and returned.

2. The returned document has a success code in the field. This means that the document has been successfully indexed. An indication of success is returned.

Embodiments provide a consistent way to store both the error documents and the valid documents in a single text index 172. Also, if an error document is later found to be a valid document, the indexing component 136 updates the text index 172 to reflect the most up to date status.

Embodiments provide uniformity in handling the error and valid documents. There are no error/non-error paths to consider. Every document is treated identically from the indexing component 136 perspective. The search engine 130 includes error checking code that is also consistent since the error checking code interfaces with the text index, not with other types of data structures, such as a relational table or log files.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain embodiments may be directed to a method for deploying computing infrastructure by a person or automated processing integrating computer-readable code into a computing system, wherein the code in combination with the computing system is enabled to perform the operations of the described embodiments.

The logic of FIGS. 4, 5, and 6 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 4, 5, and 6 may be implemented in software, hardware, programmable and non-programmable gate array logic or in some combination of hardware, software, or gate array logic.

Figure 7:
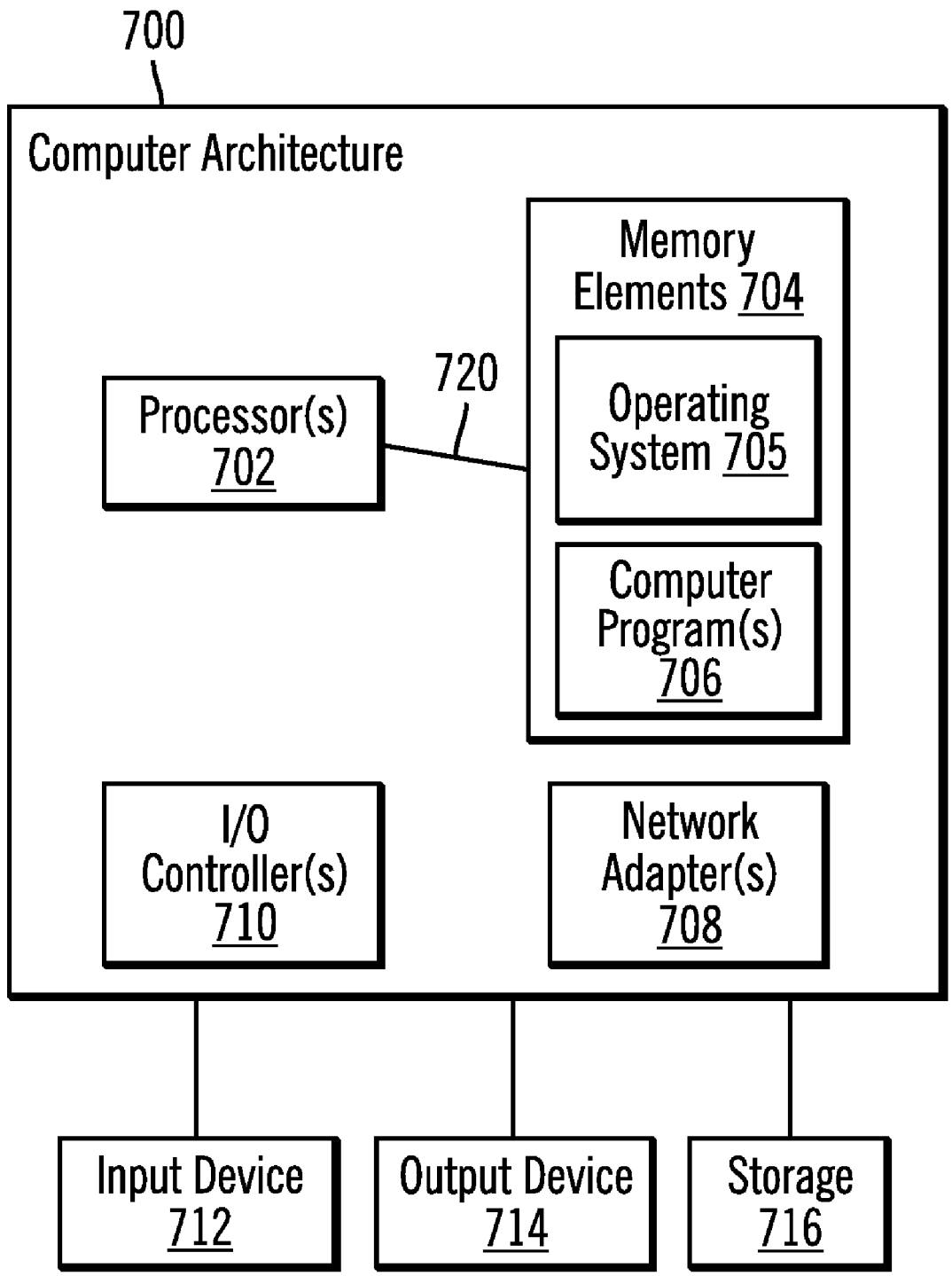
FIG. 7 illustrates a system architecture that may be used in accordance with certain embodiments.

FIG. 7 illustrates a system architecture 700 that may be used in accordance with certain embodiments. Client computer 100, server computer 120, and/or operator console 180 may implement system architecture 700. The system architecture 700 is suitable for storing and/or executing program code and includes at least one processor 702 coupled directly or indirectly to memory elements 704 through a system bus 720. The memory elements 704 may include local memory employed during actual execution of the program code, bulk storage, and cache memories which provide temporary storage of at least some program code in order to reduce the number of times code must be retrieved from bulk storage during execution. The memory elements 704 include an operating system 705 and one or more computer programs 706.

Input/Output (I/O) devices 712, 714 (including but not limited to keyboards, displays, pointing devices, etc.) may be coupled to the system either directly or through intervening I/O controllers 710.

Network adapters 708 may also be coupled to the system to enable the data processing system to become coupled to other data processing systems or remote printers or storage devices through intervening private or public networks. Modems, cable modem and Ethernet cards are just a few of the currently available types of network adapters 708.

The system architecture 700 may be coupled to storage 716 (e.g., a non-volatile storage area, such as magnetic disk drives, optical disk drives, a tape drive, etc.). The storage 716 may comprise an internal storage device or an attached or network accessible storage. Computer programs 706 in storage 716 may be loaded into the memory elements 704 and executed by a processor 702 in a manner known in the art.

The system architecture 700 may include fewer components than illustrated, additional components not illustrated herein, or some combination of the components illustrated and additional components. The system architecture 700 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A method for handling error documents, comprising:
storing, using a computer including a processor, one or more entries for valid documents and one or more entries for error documents in a documents portion of a text index and storing tokens from the valid documents in a posting lists portion of the text index, wherein each of the entries includes a first field and a second field, wherein the first field for a valid document is indexable and stores one or more tokens forming document text, wherein the first field for an error document is not indexable and stores an error message, and wherein the second field stores an indication of whether the document is an error document;

fetching a document with a document identifier; and in response to determining that the document is an error document, adding an entry in the documents portion of the text index that includes an error message in a field that is not searchable in response to a search request using one or more tokens to locate one or more documents indexed by the text index.

2. The method of claim 1, further comprising:
determining whether the document has an entry in the text index by searching for the document identifier in the text index in a documents portion storing the one or more entries for valid documents and the one or more entries for the error documents.

3. The method of claim 1, further comprising:
in response to determining that the document does not have an entry in the text index, determining whether the document is an error document.

4. The method of claim 1, further comprising:
in response to determining that the document is a valid document, adding an entry in the documents portion of the text index, wherein the entry includes one or more tokens included in the document, the document identifier, and an indication that the document is a valid document.

5. The method of claim 1, further comprising:
in response to determining that the document does have an entry in the text index,
deleting the entry; and
adding a new entry for the document in the text index.

6. The method of claim 1, wherein the document is a first document with a first document identifier and further comprising:
receiving a second document with the first document identifier;
determining that the second document has an entry in the text index;
determining that the second document is an error document;
deleting the entry in the text index; and
adding a new entry in the documents portion of the text index for the second document, wherein the new entry includes an error message, the document identifier, and an indication that the second document is an error document.

7. The method of claim 1, wherein the document is a first document with a first document identifier and further comprising:
receiving a second document with the first document identifier;
determining that the second document has an entry in the text index;
determining that the second document is a valid document;
deleting the entry in the text index; and
adding a new entry in the documents portion of the text index for the second document, wherein the new entry includes one or more tokens included in the second document, the document identifier, and an indication that the second document is a valid document.

8. The method of claim 1, wherein the document is an error document and further comprising:
constructing an alternative document having the document identifier and including the error message.

9. The method of claim 1, wherein an error occurs either when parsing the document or tokenizing the document.

10. The method of claim 1, further comprising:
receiving, using a computer including a processor, a search request for the document identifier against the text index;
determining whether the document is an error document by checking the indication in the entry in the text index for the document;
in response to determining that the document is an error document, returning error data; and
in response to determining that the document is a valid document, returning an indication that the document was successfully indexed.

11. The method of claim 1, wherein the error document includes one or more errors that prevent the error document from being indexed correctly.

12. A method for determining a status of a document, comprising:
receiving, using a computer including a processor, a search request against a text index requesting information on a status of a document having a document identifier, wherein the text index includes a documents portion storing one or more entries for valid documents and storing one or more entries for error documents, wherein each entry includes a first field and a second field, wherein the first field for a valid document is indexable and stores one or more tokens forming document text, wherein the first field for an error document is not indexable and stores an error message, and wherein the second field stores an indication of whether the document is an error document;
locating an entry in the text index for the document having the document identifier;
determining whether the document is an error document by checking the indication in the located entry; and
in response to determining that the document is an error document, returning error data.

13. The method of claim 12, further comprising:
in response to determining that the document is a valid document, returning an indication that the document was successfully indexed.

14. A computer program product comprising a computer-readable storage medium including a computer readable program, wherein the computer-readable medium is a member of a set of computer readable media consisting of a semiconductor or solid state memory, a magnetic tape, a removable computer diskette, a rigid magnetic disk, an optical disk, a magnetic storage medium, and volatile and non-volatile memory devices, wherein the computer readable program when executed by a processor on a computer causes the computer to:
store one or more entries for valid documents and one or more entries for error documents in a documents portion of a text index and storing tokens from the valid documents in a posting lists portion of the text index, wherein each of the entries includes a first field and a second field, wherein the first field for a valid document is indexable and stores one or more tokens forming document text, wherein the first field for an error document is not indexable and stores an error message, and wherein the second field stores an indication of whether the document is an error document;
fetch a document with a document identifier; and
in response to determining that the document is an error document, add an entry in the documents portion of the text index that includes an error message in a field that is not searchable in response to a search request using one or more tokens to locate one or more documents indexed by the text index.

15. The computer program product of claim 14, wherein the computer readable program when executed on a computer causes the computer to:
    determining whether the document has an entry in the text index by searching for the document identifier in the text index in a documents portion storing the one or more entries for valid documents and the one or more entries for the error documents.

16. The computer program product of claim 14, wherein the computer readable program when executed on a computer causes the computer to:
    in response to determining that the document does not have an entry in the text index, determine whether the document is an error document.

17. The computer program product of claim 14, wherein the computer readable program when executed on a computer causes the computer to:
    in response to determining that the document is a valid document, add an entry in the documents portion of the text index, wherein the entry includes one or more tokens included in the document, the document identifier, and an indication that the document is a valid document.

18. The computer program product of claim 14, wherein the computer readable program when executed on a computer causes the computer to:
    in response to determining that the document does have an entry in the text index,
    delete the entry; and
    add a new entry for the document in the text index.

19. The computer program product of claim 14, wherein the document is a first document with a first document identifier and wherein the computer readable program when executed on a computer causes the computer to:
    receive a second document with the first document identifier;
    determine that the second document has an entry in the text index;
    determine that the second document is an error document;
    delete the entry in the text index; and
    add a new entry in the documents portion of the text index for the second document, wherein the new entry includes an error message, the document identifier, and an indication that the second document is an error document.

20. The computer program product of claim 14, wherein the document is a first document with a first document identifier and wherein the computer readable program when executed on a computer causes the computer to:
    receive a second document with the first document identifier;
    determine that the second document has an entry in the text index;
    determine that the second document is a valid document;
    delete the entry in the text index; and
    add a new entry in the documents portion of the text index for the second document, wherein the new entry includes one or more tokens included in the second document, the document identifier, and an indication that the second document is a valid document.

21. The computer program product of claim 14, wherein the document is an error document and wherein the computer readable program when executed on a computer causes the computer to:
    construct an alternative document having the document identifier and including the error message.

22. The computer program product of claim 14, wherein an error occurs either when parsing the document or tokenizing the document.

23. The computer program product of claim 14, wherein the computer readable program when executed on a computer causes the computer to:
    receive a search request for the document identifier against the text index;
    determine whether the document is an error document by checking the indication in the entry in the text index for the document;
    in response to determining that the document is an error document, return error data; and
    in response to determining that the document is a valid document, return an indication that the document was successfully indexed.

24. The computer program product of claim 14, wherein the error document includes one or more errors that prevent the error document from being indexed correctly.

25. A computer program product comprising a computer-readable storage medium including a computer readable program, wherein the computer-readable medium is a member of a set of computer readable media consisting of a semiconductor or solid state memory, a magnetic tape, a removable computer diskette, a rigid magnetic disk, an optical disk, a magnetic storage medium, and volatile and non-volatile memory devices, wherein the computer readable program when executed by a processor on a computer causes the computer to:
    receive a search request against a text index requesting information on a status of a document having a document identifier, wherein the text index includes a documents portion storing one or more entries for valid documents and storing one or more entries for error documents, wherein each entry includes a first field and a second field, wherein the first field for a valid document is indexable and stores one or more tokens forming document text, wherein the first field for an error document is not indexable and stores an error message, and wherein the second field stores an indication of whether the document is a valid document or an error document;
    locate an entry in the text index for the document having the document identifier;
    determining whether the document is an error document by checking the indication in the located entry; and
    in response to determining that the document is an error document, return error data.

26. The computer program product of claim 25, wherein the computer readable program when executed on a computer causes the computer to:
    in response to determining that the document is a valid document, return an indication that the document was successfully indexed.

27. A system for handling error documents, comprising:
    hardware logic performing operations, the operations comprising:
        storing one or more entries for valid documents and one or more entries for error documents in a documents portion of a text index and storing tokens from the valid documents in a posting lists portion of the text index, wherein each of the entries includes a first field and a second field, wherein the first field for a valid document is indexable and stores one or more tokens forming document text, wherein the first field for an error document is not indexable and stores an error message, and wherein the second field stores an indication of whether the document is an error document;
fetching a document with a document identifier; and
in response to determining that the document is an error document, adding an entry in the documents portion of the text index that includes an error message in a field that is not searchable in response to a search request using one or more tokens to locate one or more documents indexed by the text index.

28. The system of claim 27, wherein the operations further comprise:
determining whether the document has an entry in the text index by searching for the document identifier in the text index in a documents portion storing the one or more entries for valid documents and the one or more entries for the error documents.

29. The system of claim 27, wherein the operations further comprise:
in response to determining that the document does not have an entry in the text index, determining whether the document is an error document.

30. The system of claim 27, wherein the operations further comprise:
in response to determining that the document is a valid document, adding an entry in the documents portion of the text index, wherein the entry includes one or more tokens included in the document, the document identifier, and an indication that the document is a valid document.

31. The system of claim 27, wherein the operations further comprise:
in response to determining that the document does have an entry in the text index,
deleting the entry; and
adding a new entry for the document in the text index.

32. The system of claim 27, wherein the document is a first document with a first document identifier and wherein the operations further comprise:
receiving a second document with the first document identifier;
determining that the second document has an entry in the text index;
determining that the second document is an error document;
deleting the entry in the text index; and
adding a new entry in the documents portion of the text index for the second document, wherein the new entry includes an error message, the document identifier, and an indication that the second document is an error document.

33. The system of claim 27, wherein the document is a first document with a first document identifier and wherein the operations further comprise:
receiving a second document with the first document identifier;
determining that the second document has an entry in the text index;
determining that the second document is a valid document;
deleting the entry in the text index; and
adding a new entry in the documents portion of the text index for the second document, wherein the new entry includes one or more tokens included in the second document, the document identifier, and an indication that the second document is a valid document.

34. A system for determining a status of a document, comprising:
hardware logic performing operations, the operations comprising:
receiving a search request against a text index requesting information on a status of a document having a document identifier, wherein the text index includes a documents portion storing one or more entries for valid documents and storing one or more entries for error documents, wherein each entry includes a first field and a second field, wherein the first field for a valid document is indexable and stores one or more tokens forming document text, wherein the first field for an error document is not indexable and stores an error message, and wherein the second field stores an indication of whether the document is a valid document or an error document;
locating an entry in the text index for the document having the document identifier;
determining whether the document is an error document by checking the indication in the located entry; and
in response to determining that the document is an error document, returning error data.

35. The system of claim 34, wherein the operations further comprise:
in response to determining that the document is a valid document, returning an indication that the document was successfully indexed.

* * * * *